June 12, 1945. J. P. MYRON 2,378,239
FILTER BOTTOM
Filed Dec. 5, 1942 4 Sheets-Sheet 1

WITNESS.
E. C. Xeiding.

INVENTOR.
John P. Myron.
BY
William R. Coley

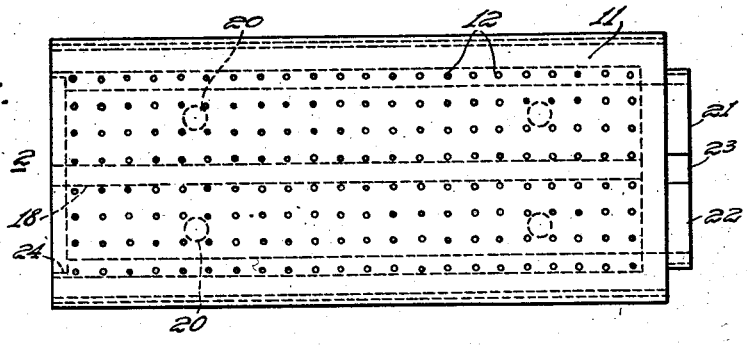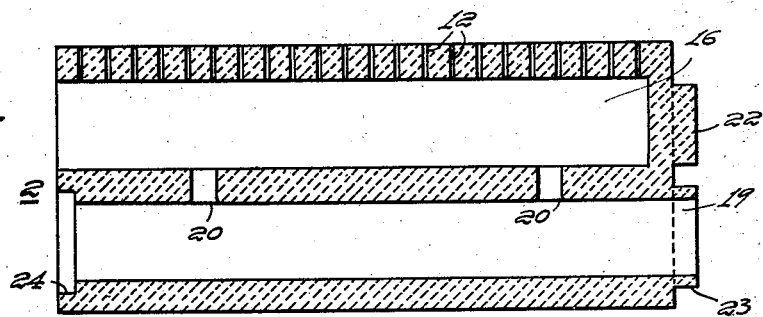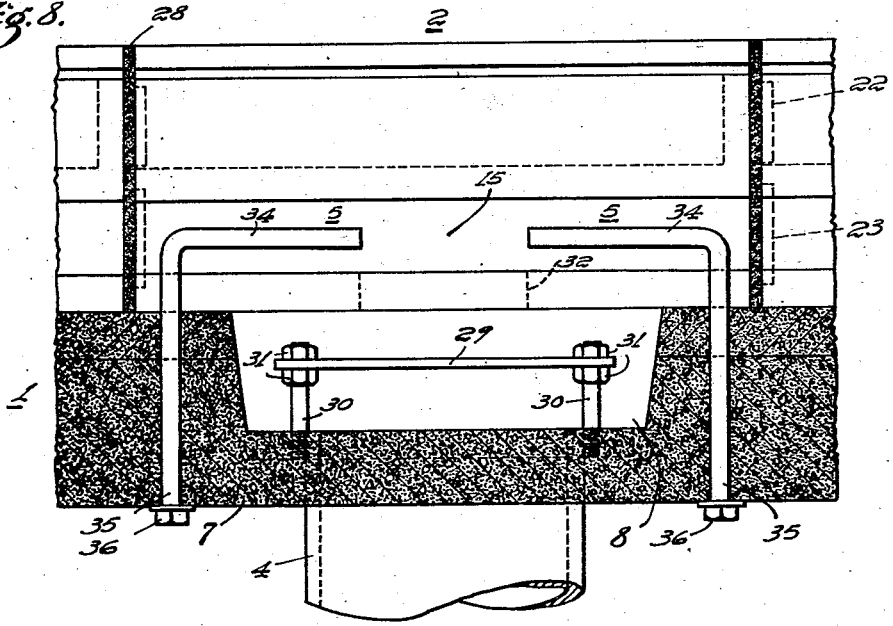

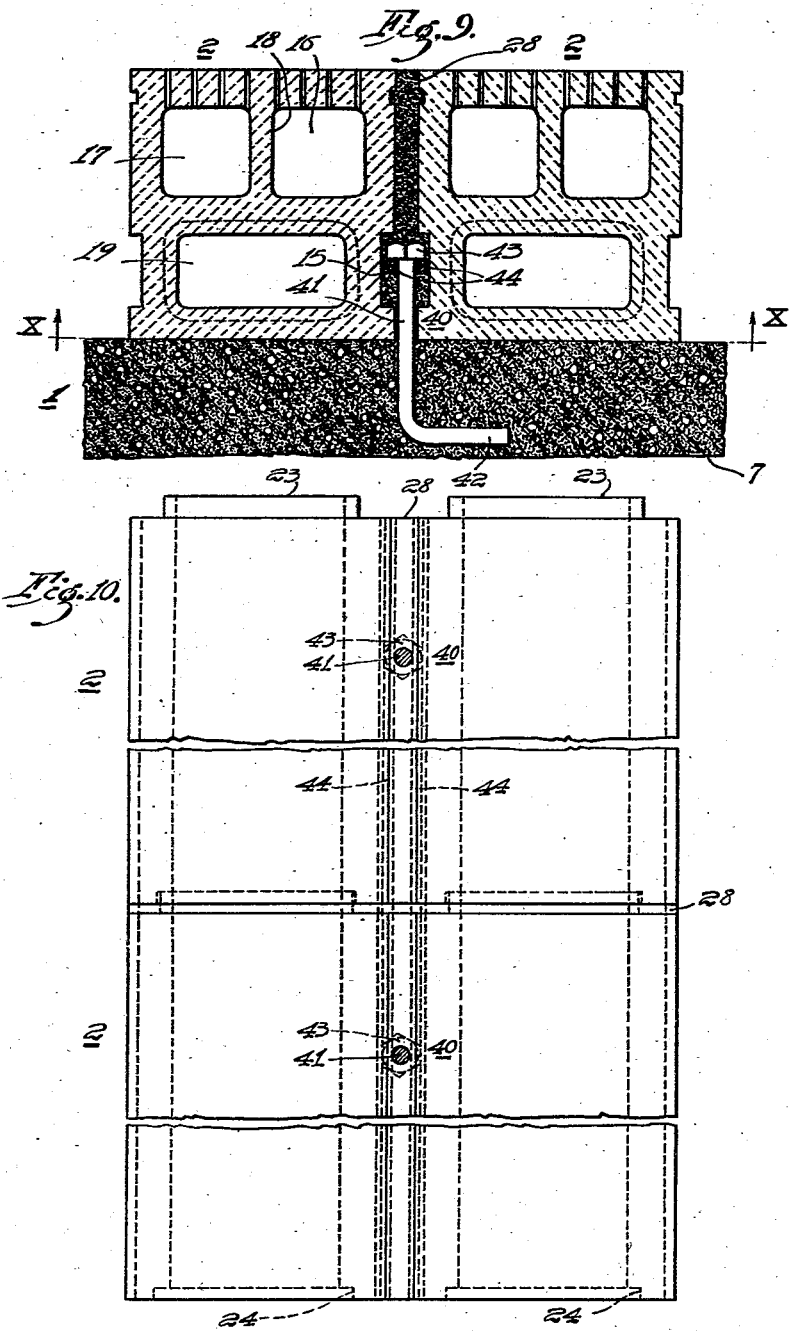

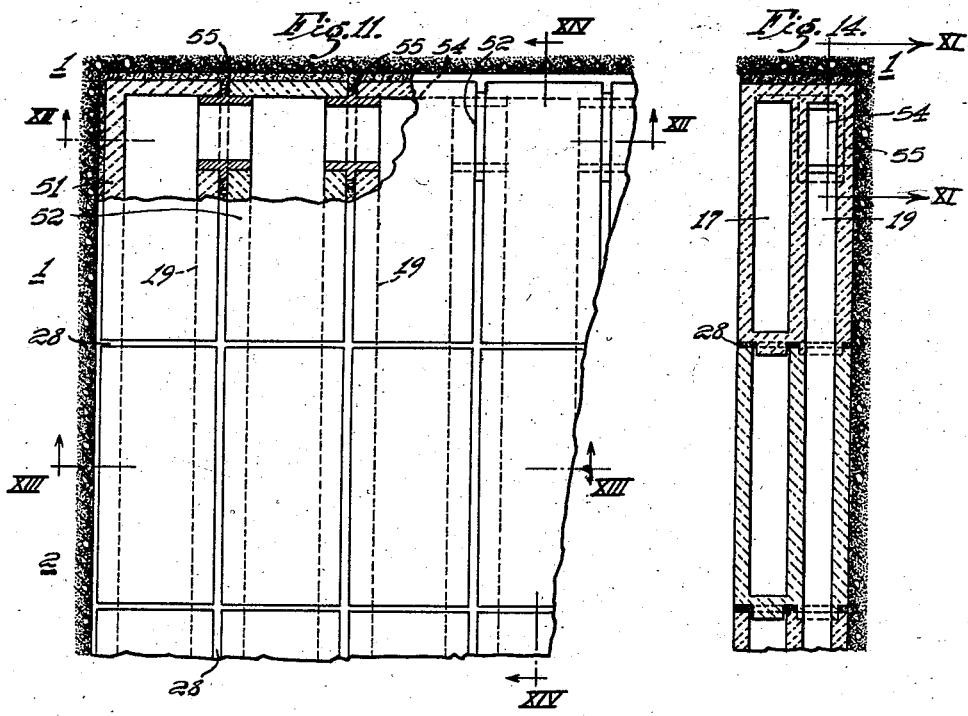

Patented June 12, 1945

2,378,239

UNITED STATES PATENT OFFICE 2,378,239

FILTER BOTTOM

John P. Myron, Pittsburgh, Pa.; Rose A. Myron, executrix of said John P. Myron, deceased, assignor to F. B. Leopold Company, Inc., a corporation of Delaware Application December 5, 1942, Serial No. 467,970

15 Claims. (Cl. 210—148)

My invention relates to filter bottoms or filter under-drains, for use in rapid sand or mechanical water filters and the like to support the filtering medium, for the purpose of producing a clear and sanitary water supply, or for use as an underdrain system for filters in sewage treatment plants.

In general, my invention further relates to apparatus of the character set forth for producing a uniform flow downwardly through the filtering medium in the process of filtering the water and a uniform flow upwardly, that is, in the reverse direction, through the filtering medium when the filter bed is given periodic washings, in accordance with a well-known practice.

Heretofore, as evidenced, for example, by Patent No. 1,572,398, February 9, 1926, Frederick B. Leopold, filter bottoms have been constructed of a combination of two or three different materials, some or all of which were subject to corrosion or disintegration and tuberculation.

It is very essential in the design of such filter bottoms to provide for an even flow of water throughout the entire area of the filter bed both when filtering and when washing the same. Furthermore, it is very important to eliminate compressed air pockets in any part of the filter bottom and to provide a free circulation of water therein.

One object of my invention, therefore, is to provide a filter bottom capable of producing the above-mentioned desirable results and, in particular, a filter bottom comprising a plurality of units, preferably made of a material having a glazed surface and each including one or more distributor chambers located beneath and having communication with the filter bed, together with a lateral conduit located beneath and having communication with said chambers, each set of distributor chambers, their respectively corresponding lateral conduit and all of the corresponding communication means being embodied in a unitary structure, thereby to prevent corrosion, disintegration and tuberculation, as well as contamination of the water supply from contact with metal parts, none of which is exposed to the fluid in my present invention.

Another object of my invention is to so construct and arrange the units of the filter bottom that, when located in final position, all such units are permanently held in such position by means of concrete grout, asphaltum or other similar materials, together with suitable bolt-like holdingdown or anchorage means, thereby preventing high water pressure from lifting or "blowing up" the beds.

A further object of my invention is to provide units of the character set forth, including distributor chambers, lateral conduits and the necessary communication means, together with a provision for interlocking the units between adjacent distributor chambers or lateral conduits or both, whereby on account of the unitary structures mentioned and the interlocking thereof, an exceptionally stable and permanent installation may be provided.

Another object of my invention is to provide a plurality of metallic members of a special form having one portion disposed in the base or support of the filter and another portion disposed in cementitious material between the blocks or units for the purpose of rigidly anchoring certain portions of the filter bottom in place.

A still further object of my invention is to provide a filter bottom in which the ends of adjacent lateral conduits are in communication with each other, thereby to eliminate compressed air pockets of the prior art at such end points and provide a complete circulation of water through said lateral conduits.

Other objects of my invention will become evident from the following detailed description, taken in conjunction with the accompanying drawings, wherein:

Fig. 6 is a view in top plan and Fig. 7 a view in longitudinal section of such an individual unit or block;

Fig. 8 is an enlarged sectional view of a portion of the structure shown in Figs. 1, 2 and 3;

Figs. 9 and 10 are views, respectively, in transverse section and in top plan of a modification of the structure shown in Fig. 8; and Fig. 11 is a view, partly in top plan and partly taken along the line XI—XI of Fig. 14, while Figs. 12, 13 and 14 are, respectively, sectional views taken along the lines XII—XII, XIII—XIII and XIV—XIV of Fig. 11, showing another feature of the present invention.

Figure 1:
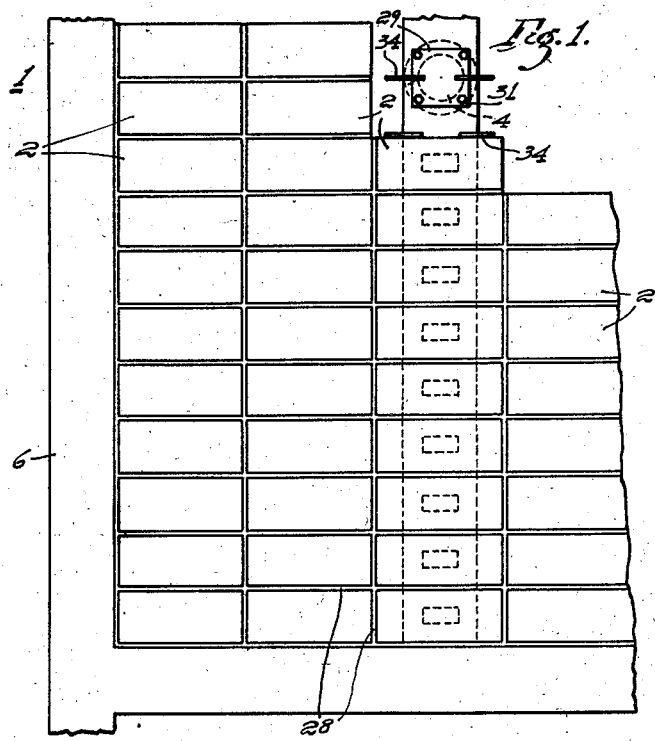
Figure 1 is a fragmentary view in top plan of a filter bottom and base constructed in accordance with my present invention.
Figure 3:
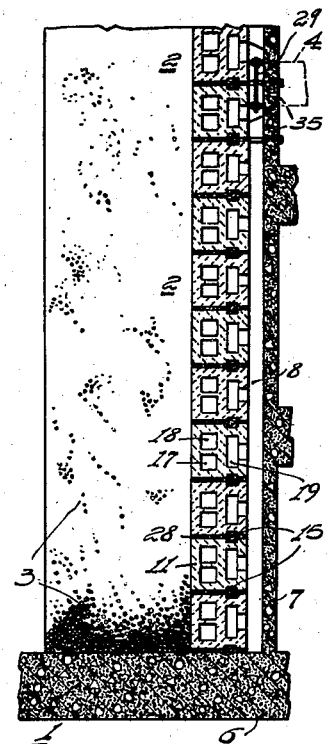

Referring first to Figs. 1 to 8, inclusive, the structure there shown comprises a suitable base or tank-like bottom support 1 of concrete or the like, having a flat floor 7 on which a plurality of my special units or blocks 2 are disposed in side-by-side and end-to-end relation, a suitable filtering medium 3, such as sand, being piled to a predetermined height above the blocks 2, a main supply pipe 4 disposed in the bottom portion of the base 1, and a plurality of holding-down or anchorage means 5 disposed in the vicinity of said pipe or elsewhere, as desired.

Figure 2:
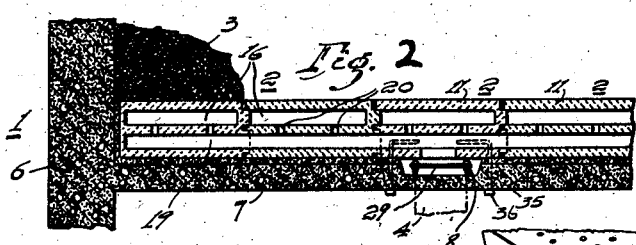
Fig. 2 is a view in longitudinal section and Fig. 3 a view in transverse section of the structure shown in Fig. 1.

The concrete base or bottom support 1 may comprise a plurality of upstanding walls 6 and a floor 7 of usual character. In the upper face of floor 7, one or more depressions or flumes 8 are provided, only one being shown, into which the pipe 4 enters, as shown in Figs. 2 and 8.

Each of my special units or blocks 2, shown in detail in Figs. 4 to 7, inclusive, comprises a top wall 11 having a multiplicity of small regularly arranged openings 12, side walls 9 and 10 extending downwardly from said top wall provided with a plurality of grooves or longitudinal slots 13, 14 and 15 for receiving grout or other cementitious material, preferably a pair of upper or distributor chambers or openings 16 and 17 separated by an interior wall or reinforcing partition 18, which distributor chambers are thus each in communication with certain of the upper perforations 12, and a lateral conduit 19 disposed below the distributor chambers 16 and 17 and substantially coextensive in width therewith, a plurality of openings or ports 20 materially larger than the perforations 12 being provided between each of the distributor chambers and said lateral conduit.

Each block 2 is preferably provided with a glazed surface so that no tuberculation occurs and no sediment or impurities will become attached to the filter bottom to cause an unsanitary condition. Moreover, the unitary structure of blocks 2 serve to prevent the disintegration of the prior-art piecemeal structures.

The openings 20 correspond in total area to the total area of perforations 12. By using openings 20 instead of the bent-over pipes 10, for example, of the above-identified Leopold patent, fluid may flow directly upwardly toward perforations 12. Any possibility of breakage of the top wall 11, by reason of such undeflected flow, is completely prevented by the provision of the reinforcing partition 18 intermediate the chambers 16 and 17.

Each of the distributor chambers 16 and 17 is provided with an integral projection or solid cap 21 and 22, respectively, at one end of each block 2, while the lateral conduit just below these projections is provided with an outstanding rim 23.

On the opposite end of each block 2, the distributor chambers 16 and 17 have an opening of such size as to closely fit around the projections 21 and 22 on the adjacent block, while the lateral conduit 19 has an enlarged opening 24 just below the ends of the distributor chambers of such size as to closely fit around the rim 23 of the adjacent block 2.

In this way, each of the blocks is longitudinally interlocked in three places with each endwise adjacent or neighboring block, the distributor chambers thus being segregated in each block, whereas the lateral conduits extend through from one block to another. These features follow because of the solid characteristic of the projections 21 and 22 and the hollow or apertured characteristic of the rim 23.

While these interlocking parts securely hold the blocks in alinement longitudinally, the blocks are held in place laterally by means of grout, asphalt or other cementitious material 28 disposed between the sides of the blocks, this material being disposed, in addition to the space directly between the blocks, in the grooves or slots 13, 14 and 15, which thus serve to securely anchor each two blocks together laterally.

Referring to Fig. 8 and particularly the holding-down or anchorage means 5, the pipe 4 is shown as imbedded in the concrete base 7 and leading into the flume or depression 8, in which a deflector plate 29 is intermediately disposed, being anchored in position by suitable bolts 30 and nuts 31. An opening 32 in the bottom wall of each block 2 that is located above a flume 8 is provided to permit flow of the fluid being treated.

In the vicinity of the pipe 4, as clearly shown in Fig. 1, a plurality of bent metallic or bolt-like members 5 having upper horizontal portions 34 and lower vertical portions 35 are placed substantially at the corners of a rectangle within the grout or other cementitious material located between one of the blocks 2 and each of its adjacent blocks. The horizontal portions 34 of each bolt-like member are disposed in the cemented space opposite the large grooves or slots 15 in adjacent blocks, while the vertical portions 35 extend through the horizontal base portion 7, the lower ends thereof being provided with suitable nuts and washers 36 to provide a further anchoring feature.

By reason of the provision of these bolt-like members, it will be noted that certain pairs of the blocks are definitely anchored to the base portion just below. It will be appreciated that as many of these holding-down or anchoring assemblies as desired may be employed. This anchoring feature, combined with the above-mentioned triple interlocking structures between the ends of each pair of blocks, serves to securely retain all of the blocks in their desired position, thus preventing high water pressure or the like from lifting or "blowing up" any portion of the filter bottom.

It will be noted that in the structure so far described, no metallic parts are exposed to the fluid being filtered, thus preventing contamination from this source. For example, in the above-mentioned Leopold patent, metallic bent pipes 10 are utilized to conduct fluid from the lateral conduits to the distributor chambers, and the upper ends of such pipes are in direct contact with the fluid being filtered.

Referring to Fig. 9 and Fig. 10, the structure there shown constitutes another means of anchoring or holding down the blocks 2.

The metallic anchoring structures 40 there shown may comprise a bolt-like member 41 having a bent lower portion 42, or such lower portion may be merely enlarged or provided with a nut or the like in order to produce an additional anchoring characteristic. The heads 43 of these bolts may be disposed at whatever spacing is desired in the large openings 15 (of adjacent blocks 2) filled with cementitious material, and the portion of the bolt below each of the heads extends downwardly into the concrete base 7, being provided, as noted above, with some bent or enlarged lower end to produce a suitable anchoring characteristic.

To provide a still further anchoring feature, a pair of steel rods 44 or the like extends longitudinally through said spaces 15 under and in contact with the heads 43 of the respective bolt-like members between alined pairs of blocks 2. It will be understood that as many sets of bolts and rods as desired may be employed.

In this way, any tendency of the blocks to lift or "blow up" is counteracted not only by the fact that the bolt-like member is anchored in the cement 7, but also by the fact that the reinforcing rods 44 are held down by the heads 43 of the longitudinally alined bolt-like members.

While not necessarily so limited, it is noted that, in general, the holding-down or anchoring structure shown in Fig. 8 is perhaps best adapted for old construction, that is, where the concrete base is already in existence, in which case holes may be drilled through the base 7 to accommodate the vertical portions 35 of the bolt-like members and the nuts 36 may be screwed on the lower ends thereof. However, for new work where the base 7 is poured as a part of the entire new filter structure, the holding-down or anchoring devices shown in Fig. 9 are preferably employed, in which case the bolt-like members are set in the concrete base 7, as illustrated.

The structure illustrated in Fig. 8 is preferably assembled as follows: The necessary holes for receiving vertical bolt portions 35 are drilled through the base 7 and nuts 36 are then tightly screwed on the lower ends thereof, the horizontal portions 34 being turned in the proper directions, that is, each pair facing each other and extending substantially parallel to the expected longitudinal direction of the blocks, which are then assembled in place on top of the base. Cementitious material is then poured between the blocks, enveloping the horizontal members 34.

The structure illustrated in Fig. 9 is preferably assembled in a similar manner. The base is poured with the bolt-like members 41 (of the selected form) embedded therein. A pair of steel rods 44 is then assembled in place beneath the head 43 of each such bolt-like member, extending substantially parallel to the expected longitudinal direction of the blocks, which are then assembled in place on top of the base. Cementitious material is then poured between the blocks, enveloping the upper part of members 41 including bolt heads 43, and steel rods 44.

Figures 4, 5:
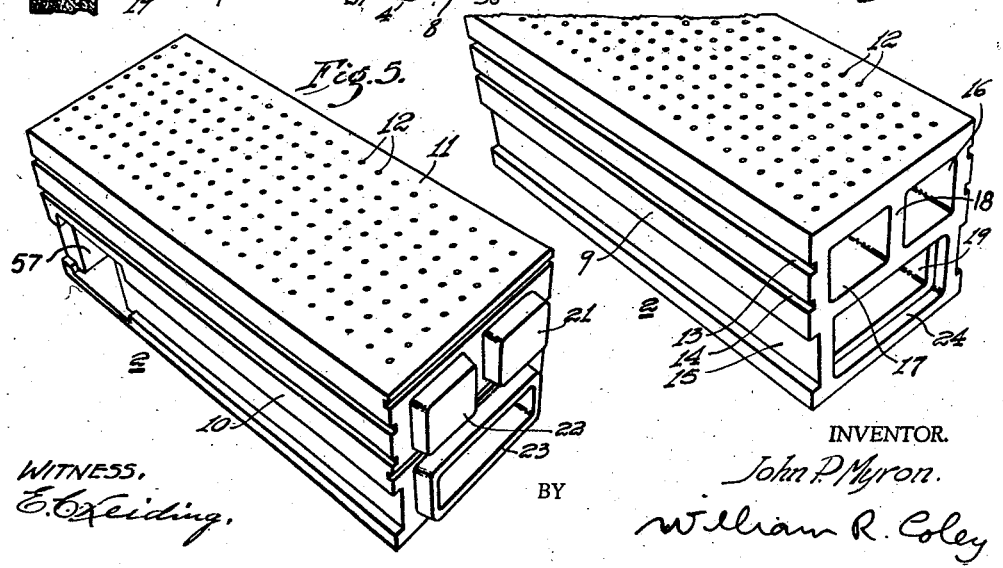
Figs. 4 and 5 are perspective views of the individual units or blocks that may be utilized in the present invention.

Referring to Figs. 11 to 14, inclusive, the structure there shown is preferably employed in connection with the filter bottom shown in Fig. 1. It will be noted that all of the blocks or units, except those in the end row, may be duplicates of the blocks 2 shown in Fig. 5, for example, while the corner block 51 is different from the block 2 and the inner blocks 52 in the end row differ from both the block 2 and the block 51. The additional feature of corner block 51 and inner blocks 52 comprises rectangular members or pipe sections 55 which serve to connect the lateral conduits 19 in each pair of blocks, by means of internal passages 54 in said pipe sections 55. Suitable sockets or depressions 57 may be molded or otherwise formed where required in the blocks 51 and 52, as shown in Fig. 5, to receive the pipe sections 55.

It will be seen that without such an end passage joining all of the lateral conduits in the adjacent rows of units or blocks, compressed air pockets would be formed at each such end, causing various deleterious results, such as uneven water pressures, and deposition of debris, etc.

However, by providing the above-mentioned end passages 54 within the pipe sections 55 which may, if desired, be set in place in the concrete when molded, in effect a continuous passage 54 extending from one side to the other at the end of each row of blocks is provided. In this way, no compressed air pockets are possible and a free and complete circulation of water of uniform pressure between the various lateral conduits is permitted.

The operation of my improved filter bottom may be set forth as follows:

When using the same for filtering purposes, water to be filtered enters the filter tank 1 at the top, passes downwardly through the filter bed 3, through perforations 12 in units 2, through distributor chambers 16 and 17 and openings 20 into lateral conduits 19 and thence through opening 32 to pipe 4.

When washing the filter, filtered water under pressure in pipe 4 is forced upwardly through opening 32 into lateral conduits 19, through openings 20, distributor chambers 16 and 17, and perforations 12 into and through filter bed 3 and thence into a drain (not shown).

By providing lateral conduits and distributor chambers as shown with large cross-sectional area and with suitable openings 20 and perforations 12, water under substantially uniform or even pressure is delivered throughout the full area of the filter bed 3, so that at the side walls 6 of the filter, the bed is thoroughly washed to the same extent as it is in the center.

Moreover, by interconnecting the ends of the lateral conduits 19, equal fluid pressures are insured at all times over the entire filter bed and unsanitary and dangerous compressed air pockets are entirely eliminated, since a complete circulation of water through and around the several lateral conduits is produced.

It will be appreciated that I have thus provided a novel and advantageous filter bottom or filter under-drain in which the distributor passages, the lateral conduits and the communication passages between the two and into the filter bed proper are all embodied in unitary blocks which are interlocked endwise by means of complementary projections and sockets and are held in position sidewise by means of grouting disposed in slots or grooves. In addition, the blocks are held down or anchored by means of metallic members extending from certain of the above-mentioned grooves between the blocks into the concrete base or support. Moreover, additional passages or openings are provided at each end of the filter bottom to effect intercommunication between all of the lateral conduits.

I do not wish to be retricted to the specific structural details or arrangement of parts herein set forth, as various further modifications thereof may be effected without departing from the spirit and scope of my invention. I desire, therefore, that only such limitations shall be imposed thereon as are contained in the accompanying claims.

I claim as my invention:

1. In a fluid filter bed, a supporting base, a unitary fluid duct structure comprising a plurality of spaced rows of perforated filter blocks substantially covering the supporting base and having cementitious material filling the space therebetween, the blocks in each row having interfitting end connections and vertical side walls with a groove recessed into each wall near the bottom surface of the block, bolts in the supporting base, extending into the space between the rows of blocks, and means cooperating with the bolts and the adjacent recessed walls for anchoring the duct structure to said supporting base.

2. In a fluid filter bed, a supporting base, a unitary fluid duct structure comprising a plurality of spaced rows of perforated filter blocks substantially covering the supporting base and having cementitious material filling the space therebetween, the blocks in each row having interfitting end connections and vertical side walls with a groove recessed into each wall near the bottom surface of the block, and a plurality of metallic anchor members in the supporting base extending into the space between the rows of blocks, said members having means cooperating with the adjacent recessed walls for anchoring the duct structure to said supporting base.

3. The combination with a plurality of alined blocks for filter bottoms having cementitious material disposed therebetween and a base of similar material on which said blocks rest, of a plurality of metallic members each having a lower portion disposed in said base and an upper portion disposed in said cementitious material between said blocks, said members being spaced from each other in a direction substantially parallel to said blocks, an enlargement at the upper end of each member and an additional member extending beneath and in contact with each of said enlargements.

4. The combination with a plurality of alined blocks for filter bottoms having cementitious material disposed therebetween and a base of similar material on which said blocks rest, of a plurality of bolt-like members each having a lower portion disposed in said base and an upper portion disposed in said cementitious material between said blocks, said members being spaced from each other in a direction substantially parallel to said blocks, a head at the upper end of each member within said cementitious material, and a plurality of rod-like members extending beneath and in contact with opposite lower faces of each of said heads.

5. In a fluid filter, the combination of a filter bed, a plurality of alined distributer chambers located beneath and having openings communicating with said bed and a plurality of alined lateral conduits located beneath and having openings communicating with respectively corresponding chambers, the ends of adjacent lateral conduits being in communication with each other thereby to eliminate compressed air pockets and provide a complete circulation of water through said lateral conduits.

6. In a fluid filter, the combination of a filter bed, a plurality of alined distributer chambers located beneath and having openings communicating with said bed and a plurality of alined lateral conduits located beneath and having openings communicating with respectively corresponding chambers, and a plurality of hollow members having their respective ends disposed in adjacent blocks at the ends of and substantially at right angles to said lateral conduits.

7. A fluid filter bottom comprising a plurality of rows of unitary box-shaped hollow blocks assembled in end-to-end relation, each of said blocks having one end open and comprising a top wall having a plurality of fluid openings, bottom and side walls and one end wall, said end wall including a conduit opening adjacent the bottom edge of the block, horizontal and vertical partition walls inside the block forming a plurality of chambers adjacent the top wall of the block and a fluid conduit adjacent the bottom wall, said conduit connecting said conduit opening at one end with said open end of the block, to provide an uninterrupted fluid passage through the blocks of each row, said horizontal partition wall having a plurality of openings from each of said chambers into said conduit, the openings in said top wall being smaller than the openings in the horizontal partition wall and the total area of the openings in the top wall being substantially equal to the total area of the openings in the horizontal partition wall.

8. A block for filter bottoms comprising a unitary box-shaped hollow structure having one end open and comprising a top wall having a plurality of fluid openings, bottom and side walls and one end wall, said end wall including a conduit opening adjacent the bottom edge of the block, horizontal and vertical partitions inside the block forming a plurality of chambers adjacent the top wall of the block and a fluid conduit adjacent the bottom wall, said conduit connecting said conduit opening at one end with said open end, to provide a fluid passage through the block, said horizontal partition having a plurality of fluid openings from each of said chambers into said fluid conduit.

9. A block for filter bottoms comprising a unitary box-shaped hollow structure having one end open and comprising a top wall having a plurality of fluid openings, bottom and side walls and one end wall, said end wall including a conduit opening adjacent the bottom edge of the block, horizontal and vertical partitions inside the block forming a plurality of chambers adjacent the top wall of the block and a fluid conduit adjacent the bottom wall, said conduit connecting said conduit opening at one end with said open end to provide a fluid passage through the block, said horizontal partition having a plurality of fluid openings from each of said chambers into said fluid conduit, the top surface of the block and all surfaces of the fluid chambers, the conduit and the fluid openings, having a ceramic glaze.

10. A block for filter bottoms comprising a unitary box-shaped hollow structure having one end open and comprising a top wall having a plurality of fluid openings, bottom and side walls and one end wall, said end wall including a conduit opening adjacent the bottom edge of the block, horizontal and vertical partitions inside the block forming a plurality of chambers adjacent the top wall of the block and a fluid conduit adjacent the bottom wall, said conduit connecting said conduit opening at one end with said open end to provide a fluid passage through the block, said horizontal partition having a plurality of openings from each of said chambers into said fluid conduit, the openings in said top wall being smaller than the openings in the horizontal partition and the total area of the openings in the top wall being substantially equal to the total area of the openings in the horizontal partition.

11. A fluid filter bottom comprising a plurality of rows of unitary box-shaped hollow blocks assembled in end-to-end relation, each of said blocks having one end open and comprising a top wall having a plurality of fluid openings, bottom and side walls and one end wall, said end wall including a conduit opening adjacent the bottom edge of the block, horizontal and vertical partition walls inside the block forming a plurality of chambers adjacent the top wall of the block and a fluid conduit adjacent the bottom wall, said conduit being substantially coextensive in width and length with the box and connecting said conduit opening at one end with said open end, to provide an uninterrupted fluid passage through the blocks of each row, said horizontal partition wall having a plurality of openings from each of said chambers into said conduit, interlocking means in said end wall of each block adapted to fit into the open ends of said chambers and said conduit, respectively, of the adjacent block in the row, whereby all the blocks of each row may be assembled in interlocked relation.

12. A fluid filter bottom comprising a plurality of rows of unitary box-shaped hollow blocks assembled in end-to-end relation, each of said blocks having one end open and comprising a top wall having a plurality of fluid openings, bottom and side walls and one end wall, said end wall including a conduit opening adjacent the bottom edge of the block, horizontal and vertical partition walls inside the block forming a plurality of chambers adjacent the top wall of the block and a fluid conduit adjacent the bottom wall, said conduit being substantially coextensive in width and length with the box and connecting said conduit opening at one end with said open end, to provide an uninterrupted fluid passage through the blocks of each row, said horizontal partition wall having a plurality of openings from each of said chambers into said conduit, male interengaging means at the periphery of said end wall and of said conduit opening of each block adapted to fit into complementary receiving recesses in the walls and partition walls at said open end of the adjacent block in the row, whereby all of the blocks of each row may be assembled in interlocked relation.

13. A block for filter bottoms comprising a unitary box-shaped hollow structure having one end open and comprising a top wall having a plurality of fluid openings, bottom and side walls and one end wall, said end wall including a conduit opening adjacent the bottom edge of the block, horizontal and vertical partitions inside the block forming a plurality of chambers adjacent the top wall of the block and a fluid conduit adjacent the bottom wall, said conduit connecting said conduit opening at one end with said open end to provide a fluid passage through the block, said horizontal partition having a plurality of fluid openings from each of said chambers into said fluid conduit, interlocking means in said end wall, and complementary recesses in the walls and partitions at said open end of said block, whereby a plurality of blocks may be interlocked in end-to-end relation.

14. A block for filter bottoms comprising a unitary box-shaped hollow structure having one end open and comprising a top wall having a plurality of fluid openings, bottom and side walls and one end wall, said end wall including a conduit opening adjacent the bottom edge of the block, horizontal and vertical partitions inside the block forming a plurality of chambers adjacent the top wall of the block and a fluid conduit adjacent the bottom wall, said conduit connecting said conduit opening at one end with said open end to provide a fluid passage through the block, said horizontal partition having a plurality of fluid openings from each of said chambers into said fluid conduit, male interengaging means at the periphery of said end wall and of said conduit opening, and complementary receiving recesses in the walls and partition walls at said open end of the block, whereby a plurality of blocks may be interconnected in end-to-end relation.

15. In a fluid filter bed, a supporting base, a unitary fluid duct structure comprising a plurality of spaced rows of perforated filter blocks substantially covering the supporting base and having cementitious material filling the space therebetween, the blocks in each row having interfitting end connections and vertical side walls with a groove recessed into each wall near the bottom surface of the block, and a plurality of metallic anchor members in the supporting base extending into the space between the rows of blocks, said members having bent portions extending in a direction substantially parallel to said rows for cooperating with the adjacent recessed walls for anchoring the duct structure to said supporting base.

JOHN P. MYRON.